United States Patent [19]

Quinart et al.

[11] Patent Number: 4,704,773
[45] Date of Patent: Nov. 10, 1987

[54] MACHINE TOOL STRUCTURE

[75] Inventors: Pierre Quinart, La Balme de Sillingy; Georges Schoellhammer, Cluses; Pierre Tableau, Pringy; Francois Vivien, Veyrier-du-Lac, all of France

[73] Assignee: Machines Outils Wirth et Gruffat, France

[21] Appl. No.: 873,624

[22] Filed: Jun. 12, 1986

[51] Int. Cl.[4] .............................................. B23B 9/00
[52] U.S. Cl. ........................................ 29/27 C; 29/39; 29/55; 82/36 A
[58] Field of Search .................. 29/568, 27 C, 27 R, 29/39, 55, 26 A, 50, 54; 82/36 A; 409/131, 202, 203

[56] References Cited

U.S. PATENT DOCUMENTS

| 1,790,943 | 2/1931 | Mullin | 29/55 |
| 3,527,139 | 9/1970 | Cunningham et al. | 29/26 A |
| 3,668,971 | 6/1972 | Dever | 409/131 |
| 4,484,387 | 11/1984 | Nachmany | 29/568 |

FOREIGN PATENT DOCUMENTS

| 1811462 | 6/1970 | Fed. Rep. of Germany | 29/55 |
| 2514615 | 10/1976 | Fed. Rep. of Germany | 29/568 |
| 3025453 | 1/1982 | Fed. Rep. of Germany | 82/36 A |
| 995466 | 12/1951 | France | 409/202 |
| 2504037 | 10/1982 | France | 29/568 |
| 82157 | 7/1981 | Japan | 29/568 |
| 156102 | 9/1982 | Japan | 29/568 |
| 2082484 | 3/1982 | United Kingdom | 29/568 |
| 2129718 | 5/1984 | United Kingdom | 29/568 |
| 2154161 | 9/1985 | United Kingdom | 29/39 |
| 563220 | 6/1977 | U.S.S.R. | 29/568 |
| 933372 | 6/1982 | U.S.S.R. | 29/568 |
| 1133068 | 1/1985 | U.S.S.R. | 409/203 |

Primary Examiner—William R. Briggs
Attorney, Agent, or Firm—Ratner & Prestia

[57] ABSTRACT

The structure comprises a rotary conventional lathe work piece holding spindle, mounted for sliding on vertical guides and a tool holding assembly mounted for sliding along two perpendicular horizontal axes. The tool holding assembly receives fixed tools and motorized auxiliary units whose rotational axis is either parallel to the axis of the spindle or perpendicular.

8 Claims, 1 Drawing Figure

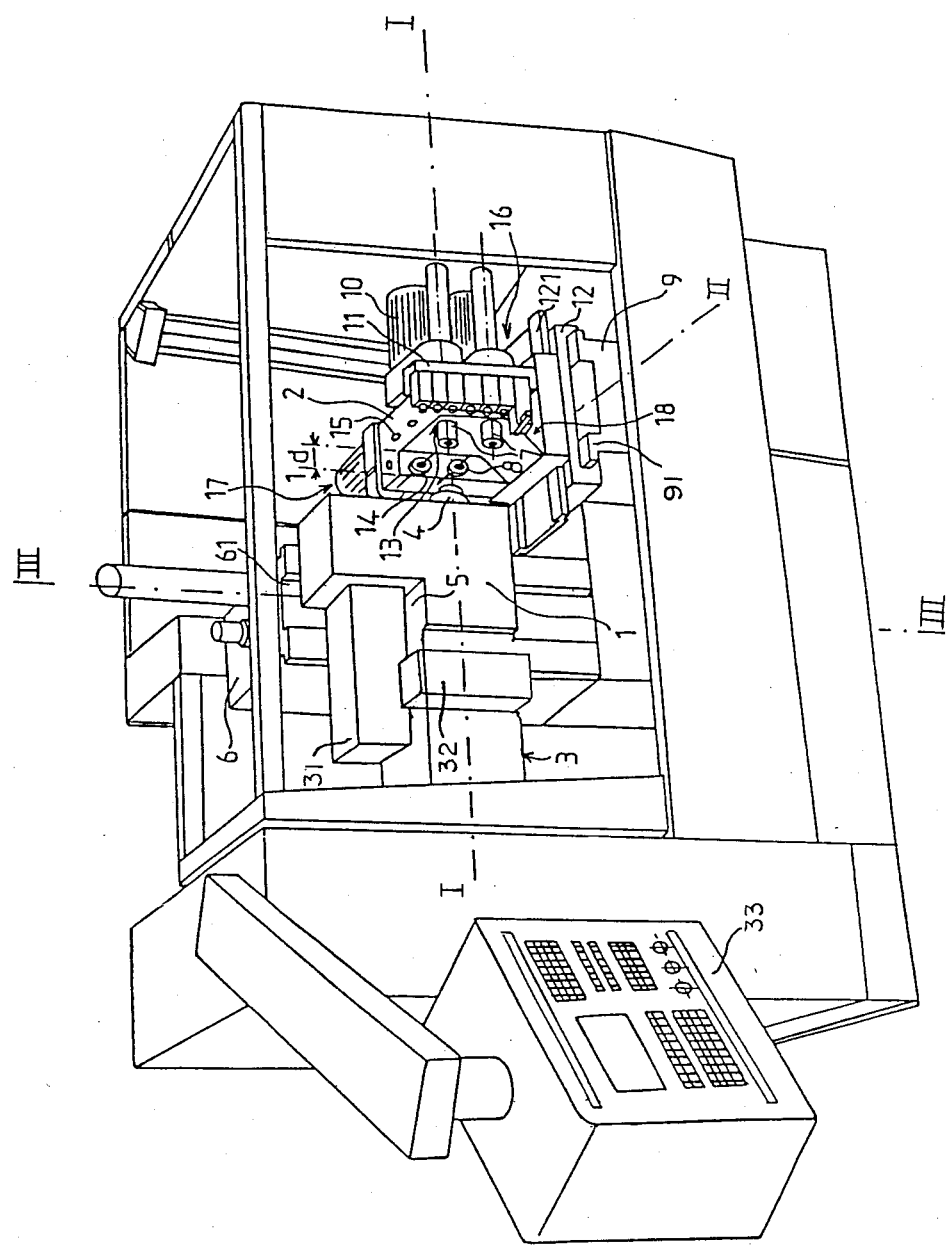

MACHINE TOOL STRUCTURE

BACKGROUND OF THE INVENTION

The present invention relates to machine tools comprising a rotary spindle and a tool assembly, as well as means for varying the relative position of the spindle and the tools.

The machine tools used at the present time comprise several families and, in particular: lathes comprising a rapid rotary spindle for supporting the work piece to be machined and for presenting it rotating in front of fixed or slow moving tools; milling machines comprising a plate or a support for the work piece to be machined, which moves slowly or not at all, the tool being mounted on a rapid rotation spindle.

Known devices are well adapted to high rate production, in which the operations to be carried out by a same machine tool on a work piece are relatively few in number and simple.

Attempts have been made recently to increase the machining possibilities of the work piece using the same machine tool. However, the devices used up to the present time are relatively ill adapted to medium scale production in which the machine tool must carry out a relatively high number of elementary operations.

The present invention provides a new machine tool structure, derived from the lathe and forming an assembly particularly well adapted to medium scale production with complex machining.

The device may be used for machining simple work pieces as well as for machining complex work pieces and provides gains in productivity all the higher the more complex the work pieces.

SUMMARY OF THE INVENTION

The same machine tool structure of the invention allows the machining possibilities of a conventional lathe to be substantially enlarged and, in particular, operations similar to those of lathe work to be performed in particular without removing the work piece to be machined, without any change of tool and without stopping the machine: for example milling, drilling, boring, tapping, screw threading or front or side machining, along the axis of the work pieces, parallel to their axes or perpendicularly to their axes.

With the new structure auxiliary rotating tool units may be systematically used, leaving however the possibility of using fixed tools. The same auxiliary units as those currently used on transfer machines may in particular be adapted and changed in position, each auxiliary unit being able to comprise independent means for rotating a tool and possibly independent means for positioning the tool with respect to a frame. The new structures thus described increase the possible uses of a pool of auxiliary units which may thus be adapted to machines as different as transfer machine or a small scale production machine.

The number and nature of the operations subsidiary to the turning operations which can be performed with the structure of the invention depend on the number and type of auxiliary working units which the user adapts to the structure. With the invention, on the same structure, a large number of auxiliary units may be adapted simultaneously, for example from four to twelve units.

To attain these objects as well as others, the structure of the invention uses, conventionally, as on a conventional lathe, a certain number of subassemblies: a work piece gripping spindle rotating along a horizontal axis, a tool holder assembly movable in horizontal translation with respect to the spindle along a first axis parallel to the axis of the spindle and along a second perpendicular axis, tools mounted fixedly on the tool holding assembly and rotary tools mounted on the tool holder assembly.

According to the invention, the tool holding spindle is mounted on a carriage sliding over guides of the frame along a vertical axis, and the means for driving the spindle comprise at least one motor and electronic control means for adjusting very rapidly the rotational speed of the spindle, then stopping it in successive angular positions chosen by the user.

All the tools, fixed or rotary, are mounted on the same tool holding assembly adapted for receiving and holding in position auxiliary motorized work units disposed at different heights, parallel to the axis of the spindle or perpendicular to the axis of the spindle, or even at any angle with respect to the axis of the spindle, each unit having its work tool permanently available. No change of tool is required during machining of the work piece, so that the working precision obtained is excellent.

According to another feature of the invention, the assembly of rotating tools is arranged in two separate families, a first family with axis parallel to the axis of the spindle and a second family with axis perpendicular to the axis of the spindle; the second family forms a row of tools in a vertical line.

With this architecture, in particular, there is great accessibility to the devices rotating the tools, allowing even space consuming auxiliary units to be used, ensuring a great ease of access for maintaining or changing them.

BRIEF DESCRIPTION OF THE DRAWING

Other features, objects and advantages of the present invention will be clear from the following description of a particular embodiment, with reference to the accompanying FIGURE showing a schematical perspective view of a machine tool of the invention.

DESCRIPTION OF THE PREFERRED EMBODIMENT

As shown in the FIGURE, the machine of the invention comprises a frame formed of a vertical upright 6 formed of a horizontal bench 9 to which it is connected by a connecting piece. A guide means assembly ensures the relative movements between a spindle holding assembly 1 and a tool holding assembly 2. The spindle holding assembly 1 comprises drive means designated in the FIGURE by the general reference 3, actuating a rotary work piece gripping spindle 4 with horizontal longitudinal axis I—I.

In a simplified embodiment, spindle 4 is actuated by a main motor 31 for driving it rapidly within the range of speeds usually used for machines called "lathes". The motor is controlled by a digital control 33 and is associated with a mechanical indexing device, for example a divider plate of known type mounted on the spindle and cooperating with a retractable locking stud for locking the spindle in angular positions determined by the digital control 33.

In a more elaborate embodiment, shown schematically in the FIGURE, the positioning and locking of the spindle in given angular positions are provided by a disengagable auxiliary motor 32 able to drive the spindle 4 and the main motor 31 in a slow rotational movement, and to provide locking substantially in all angular positions. Such a drive may be obtained by a DC motor controlled by the digital control 3 depending on the information collected from angular position sensors integral with the spindle or with the shaft of the motor, the assembly ensuring slaving of the position of the motor. With this more elaborate arrangement, a slow movement of the spindle may be provided during machining operations using tools carried by the auxiliary units. Thus for example helical, or spiral or other complex forms of machining may be carried out.

The digital control 33 may for example be a device known per se and widely used commercially such as the control known under the reference 570 by the firm NUM.

The spindle holding assembly 1 is mounted on a carriage 5 itself sliding over guide 61 of the vertical upright 6 along a vertical axis III—III.

The tool holding assembly 2 is mounted on a crossed slide 12 which slides horizontally on guides 91 of the horizontal bench 9 with a translational movement with transverse axis perpendicular to the axis I—I of the work piece holding spindle. The crossed slide 12 comprises longitudinal guides 121 cooperating with the tool holding assembly 2 for horizontal translation thereof parallel to the axis I—I of the spindle.

The tool holding assembly 2 comprises two families of rotary tools, a first family 7 whose tools have tool axes parallel to the axis I—I of the spindle 4, and a second family 8 whose tool axes are perpendicular to the axis of the spindle. The tools of family 8 are arranged one above the other in a vertical line so as to occupy a length d as reduced as possible, the length d representing the order of size of the longitudinal travel required for machining.

Preferably, the family 8 of tools is arranged in a line parallel to the third axis III—III although an arrangement in accordance with the second axis II—II is also possible. In the arrangement shown in the FIGURE, removal of the waste takes place naturally downwards for example into a wheeled tank and the assembly of spindles and tools is very easily accessible from the front of the machine. The rotary tools may be mounted on auxiliary units 10, readily accessible from two external sides of the tool holding assembly 2, and ensuring the rotational and translational drive of the tools.

In the embodiment shown in the Figures, the tool holding assembly 2 is a metal block comprising two vertical walls perpendicular to each other, with, on an external vertical face 18, fixing holes for fitting a turning tool holding plate 11; the first wall comprises a first series 13 of horizontal through bores parallel to the axis I—I of the spindle; the second wall comprises a second series 14 of horizontal through bores perpendicular to the axis I—I of the spindle; other oblique bores may be provided if required; fixing holes 15 are pierced in the upper part for fitting other different equipment; a second tool holding assembly may for example be superimposed.

The bores of the two series 13 and 14 of horizontal bores and the oblique bores are through bores with relative positions and dimensions determined accurately for forming reference surfaces and receiving with very small play auxiliary units comprising a complementary surface. Preferably, auxiliary units are used having a cylindrical outer surface fitting into and locking in complementary cylindrical bores of the tool holding assembly. Locking may be provided by a tangent plug coming into abutment against the outer surface of the cylindrical portion of the auxiliary unit, the plug being actuated by means of a screw housed in a threaded bore of the tool holding assembly. The auxiliary units are introduced from the outside, that is to say from the faces 16 and 17 of the tool holding assembly.

Preferably, auxiliary units may be used with independent drive, comprising a drive motor with gearing down and possibly a bevel gear and a tool holding spindle.

These auxiliary units are currently used in a large number of known machines and may more particularly use the machining unit bearing the reference 55000 from the firm WIRTH & GRUFFAT, the tapping unit bearing the reference 59000 of the firm WIRTH & GRUFFAT or a drilling unit with independent hydropneumatic advance bearing the reference 57000 from the firm WIRTH & GRUFFAT.

The carriage 5 carrying the spindle 4 is actuated by a drive means with vertical travel controlled by the digital control 33. Similarly, the crossed slide 12 is actuated by a drive means with transverse travel with respect to the frame and the tool holding assembly 2 is driven with respect to the crossed slide 12 by a drive means with longitudinal travel, the drive means being controlled by the digital control 33. Each drive means is advantageously formed of a DC electric motor associated with a ball screw-nut type of transmission for producing a translational movement. The auxiliary units carried by the tool holding assembly are also controlled by the digital control 33.

The architecture of the invention allows the work pieces to be machined to be changed from the top or from the front, the spindle holding assembly 1 being disengaged by sliding along the vertical slide 6, the work piece being able to be exchanged above the tool holding assembly 2 or there in front without hindering the accessibility. The translational movement along the axis I—I may be moved for bringing closer a magazine of work pieces.

The operation of the device is as follows:

The turning operations are performed by means of tools mounted on the tool holding plate, by positioning the rotary spindle 4 carrying the work piece in a vertical movement for bringing the axis of the spindle in the horizontal plane containing the tool tip, then by moving the tool holding assembly parallel and transversely to the axis of the spindle.

The subsidiary turning operations are carried out by the motorized auxiliary units 7 and 8. Depending on their type, these operations are performed while the spindle and the work piece to be machined are rotating or while the spindle and the work piece are stopped. The three translational axes are used The complete cycle for machining the work piece comprising the turning operation and the subsidiary operations is carried out without stopping the machine or without removing the work piece and without any change of tools for the working tools keep their same relative positions during the whole of the cycle.

Depending on the expediency, the spindles of the auxiliary work units may be driven by means of conventional asynchronous motors or by means of motors with speed regulation. In the first place, the desired speed is obtained by mounting the correct set of pulleys and belt and, in the second case, the desired speed is displayed on the digital control 33.

In the case where one or more auxiliary units are to be slanted through a certain angle with respect to the spindle, it is more convenient for these units to comprise an advance control device integrated with the units.

What is claimed is

1. A machine tool comprising:
   a. a work-piece-holding rotatable spindle;
   b. drive means for driving said spindle rotationally at lathe speed about a horizontal axis;
   c. a tool-holding assembly movable in horizontal translation with respect to the spindle along a longitudinal axis parallel to the spindle axis and also along a transverse axis perpendicular to the spindle axis, said tool-holding assembly being adapted to receive fixed tools and rotatable tools;
   d. tools mounted fixedly on the tool-holding assembly;
   e. means mounted on the tool-holding assembly for driving the rotatable tools rotationally;
   f. a carriage on which said work-piece-holding spindle is mounted, said carriage being slidable on guides of the frame along a vertical axis;
   g. said drive means for driving said spindle comprising at least one motor and electronic control means for adjusting the speed of rotation of the spindle and for stopping said spindle in successive given angular positions;
   h. said means mounted on said tool-holding assembly for driving the rotatable tools including through bores for receiving and holding in position auxiliary work units with independent drive;
   i. said rotatable tools being arranged in a first family having horizontal axes parallel to the axis of the spindle and a second family having horizontal axes perpendicular to the axis of the spindle;
   j. said second family comprising a row of tools with horizontal axes along a vertical line;
   k. said tool-holding assembly comprising two vertical walls perpendicular to each other having a vertical outer face having holes mounted for fixing a turning-tool holding plate, one of said walls having a series of horizontal through bores parallel to the axis of said spindle for receiving auxiliary work units, the other of said walls having a series of horizontal through bores perpendicular to the axis of the spindle for receiving auxiliary work units, and fixing holes for mounting different equipment in the upper part of said tool-holding assembly.

2. A machine tool comprising:
   a. a work-piece-holding rotatable spindle;
   b. drive means for driving said spindle rotationally at lathe speeds about a horizontal axis;
   c. a tool-holding assembly movable in horizontal translation with respect to the spindle along a longitudinal axis parallel to the spindle axis and also along a transverse axis perpendicular to the spindle axis, said tool-holding assembly being adapted to receive fixed tools and rotatable tools;
   d. tools mounted fixedly on the tool-holding assembly;
   e. means mounted on the tool-holding assembly for driving the rotatable tools rotationally;
   f. a carriage on which said work-piece-holding spindle is mounted, said carriage being slidable on guides of the frame along a vertical axis;
   g. said drive means for driving said spindle comprising:
      i. a main motor and a digital control for controlling said main motor for high speed driving of said spindle;
      ii. an auxiliary disengagable motor controlled by said digital control for providing slow speed driving of said spindle and for locking said spindle in chosen positions;
      iii. angular position sensors for detecting the angular position of the spindle and for transmitting the detected information of said digital control.

3. A machine tool comprising:
   a. a work-piece-holding rotatable spindle;
   b. drive means for driving said spindle rotationally at lathe speeds about a horizontal axis;
   c. a tool-holding assembly movable in horizontal translation with respect to the spindle along a longitudinal axis parallel to the spindle axis and also along a transverse axis perpendicular to the spindle axis, said tool-holding assembly being adapted to receive fixed tools and rotatable tools;
   d. tools mounted fixedly on the tool-holding assembly;
   e. means mounted on the tool-holding assembly for driving the rotatable tools rotationally;
   f. a carriage on which said work-piece holding spindle is mounted, said carriage being slidable on guides of the frame along a vertical axis;
   g. said drive means for driving said spindle comprising at least one motor and electronic control means for adjusting the speed of rotation of the spindle and for stopping said spindle in successive given angular positions; and
   h. said means mounted on said tool-holding assembly for driving the rotatable tools including through bores for receiving and holding in position auxiliary work units with independent drive.

4. A machine tool according to claim 3 further comprising a frame formed of a vertical upright and a horizontal bench and a connecting piece connecting said vertical upright and bench, said vertical upright having guides on which is slidably movable said carriage on which said work-piece-holding spindle is mounted, said horizontal bench comprising means for guiding and supporting said tool-holding assembly.

5. A machine tool according to claim 4 wherein said horizontal bench comprises horizontal transverse guides and a cross slide which is slidable thereon, said cross slide carrying longitudinal guides on which said tool-holding assembly is slidable.

6. A machine tool according to claim 3 wherein said tool-holding assembly further comprises through bores for receiving and disposing auxiliary work units along an oblique axis with respect to the axis of the spindle.

7. A machine tool comprising:
   a. a work-piece-holding rotatable spindle;
   b. drive means for driving said spindle rotationally at lathe speeds about a horizontal axis;
   c. a tool-holding assembly movable in horizontal translation with respect to the spindle along a longitudinal axis parallel to the spindle axis and also along a transverse axis perpendicular to the spindle axis, said tool-holding assembly being adapted to receive fixed tools and rotatable tools;
   d. tools mounted fixedly on the tool-holding assembly;

e. means mounted on the tool-holding assembly for driving the rotatable tools rotationally, said rotatable tools being arranged in a first family having horizontal axes parallel to the axis of the spindle and a second family having horizontal axes perpendicular to the axis of the spindle;

f. a carriage on which said work-piece-holding spindle is mounted, said carriage being slidable on guides of the frame along a vertical axis; and g. said drive means for driving said spindle comprising at least one motor and electronic control means for adjusting the speed of rotation of the spindle and for stopping said spindle in successive given angular positions.

8. A machine tool according to claim 7 wherein said second family comprises a row of tools with horizontal axes along a vertical line.

* * * * *